March 8, 1927.
E. E. JOHNSON
1,620,465
DISPLACEMENT RESPONSIVE DEVICE
Filed Nov. 5, 1925
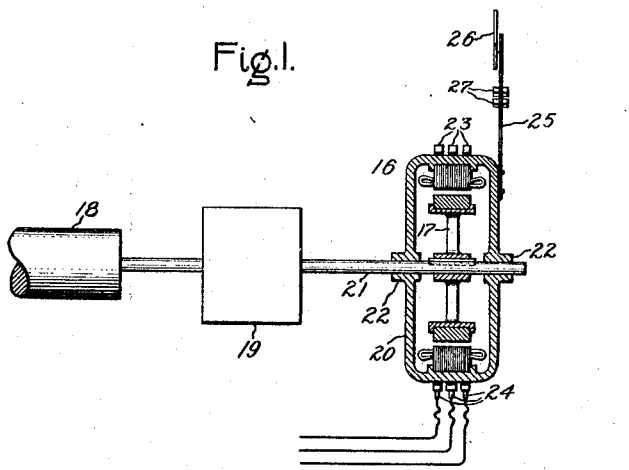
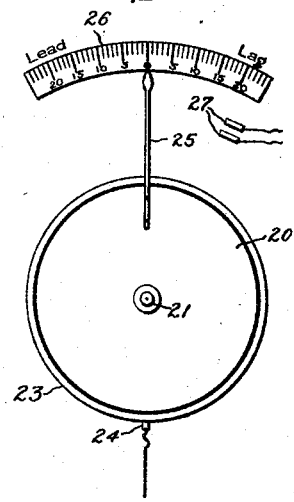
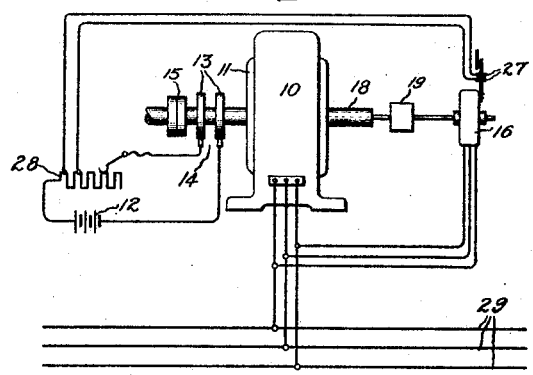
Inventor:
Ernest E. Johnson,
by
His Attorney.

Patented Mar. 8, 1927.

1,620,465

UNITED STATES PATENT OFFICE.

ERNEST E. JOHNSON, OF SCOTIA, NEW YORK, ASSIGNOR TO GENERAL ELECTRIC COMPANY, A CORPORATION OF NEW YORK.

DISPLACEMENT-RESPONSIVE DEVICE.

Application filed November 5, 1925. Serial No. 67,141.

My invention relates to a device which is responsive to the displacement angle of synchronous dynamo electric machines.

In the synchronous type of dynamo electric machine one member is provided with an alternating current winding which when energized by an alternating current of the proper phase sets up a magnetic field with respect to the iron structure in which the winding is located which is either alternating along one axis or rotating, depending upon whether the machine is single or polyphase. The other member is provided with a magnetic structure either with or without exciting windings arranged with poles which cooperate with the magnetic poles of the other member to produce synchronous motor or generator action.

The most usual form of such a machine comprises a stator member provided with a distributed polyphase winding and a salient pole rotor member arranged to be excited by direct current. In explaining my invention the usual form of synchronous machine will be referred to although the invention is generally applicable to all types of synchronous machines. Such a machine may be used either as a motor or as a generator. When there is neither motor or generator action the stator and rotor field poles exactly line up with each other and the displacement angle is zero. When acting as a motor the magnetic field of the driven member lags behind that of the driving member by a displacement angle called the angle of lag. When acting as a generator the magnetic field of the member which is being driven by another motor leads the magnetic field of the other member. This angle is called the angle of lead. The displacement angle, whether it be an angle of lead or lag, is proportional to the load and inversely proportional to the field strength between stator and rotor. The action is somewhat analogous to that which could be imagined if the various magnetic lines between stator and rotor were replaced by rubber bands. In the testing of such machines it is often desirable to determine the displacement angles under various conditions in order to determine the characteristics of the machine and to provide data for future designs. It is the object of my invention to provide a simple device for measuring such angles.

The features of my invention which are believed to be novel and patentable will be pointed out in the claim appended hereto. For a better understanding of my invention reference is made in the following description to the accompanying drawings in which Fig. 1 represents a cross section through one embodiment of my displacement responsive device and its mechanical connection to the machine under investigation; Fig. 2 is a face view of the device shown in Fig. 1; and Fig. 3 represents appropriate electrical connections between the device and the machine under investigation.

In carrying my invention into effect I provide a miniature synchronous machine the rotor and stator members of which are free to rotate with respect to each other. One member is mechanically connected to the rotating part of the machine under investigation and the other member carries a pointer which cooperates with a stationary scale. One of the members carries an alternating current winding which is electrically connected to the alternating current terminals of the machine under investigation. The mechanical and electrical connections between the two synchronous machines are such that the pointer secured to the one member of the device indicates on the stationary scale the displacement angle of the machine under investigation and the direction thereof.

Referring to the drawings, 10 in Fig. 3 indicates the usual type of synchronous machine and for the purposes of this description will be considered to have 10 poles with salient pole rotor 11 excited from a direct current source 12 through slip rings 13 and brushes 14. If a motor it will drive a load, not shown, through a coupling 15. If a generator it will be driven through coupling 15 from a motor, not shown. The displacement measuring device is indicated at 16 and as more clearly shown in Figs. 1 and 2 comprises in this instance a salient pole bipolar rotor 17 connected to the shaft 18 of the machine 10 through gearing 19. If the device 16 and machine 10 had the same number of poles the gearing indicated at 19 would not be necessary. However it is preferable to make the device 16 bipolar both for the sake of simplicity and for the sake of obtaining the greatest possible angular deflection. For the pole number assumed the gear ratio at 19 will be such as to multiply five times the speed between shaft 18 and the rotor of device 17. The gear train will be preferably arranged so as to be readily changed to a different ratio so that the apparatus may be used for machines of different pole numbers. The member 20 of the device 16 will be provided with an alternating current winding of the same number of phases as the machine to be tested and of the same number of poles as that of the rotor 17. It is freely pivoted on the shaft 21 through its frame and bearings 22. The winding thereof is connected with slip rings 23 which cooperate with stationary brushes 24 and these brushes are connected either directly or through a transformer to the alternating current terminals of the machine to be tested, as shown in Fig. 3, so as to give the same direction of phase rotation as the mechanical rotation of member 17. The member 20 carries a pointer 25 cooperating with a stationary scale 26. The scale 26 may be calibrated either in mechanical or electrical displacement degrees of the machine to be tested, preferably in electrical degrees since then the calibration will not change when testing machines of different pole numbers. In the present case five electrical degrees deflection on scale 26 represents the same number of electrical degrees displacement between rotor and stator of machine 10, or one mechanical degree displacement.

As thus arranged let it be assumed that the machine 10 is rotating at synchronous speed and that its rotor and stator are normally excited without load. If the alternating current source represented at 29 is 60 cycles shaft 18 will rotate at 720 R. P. M. and shaft 21 will rotate at 3600 R. P. M. Since the alternating current winding of member 20 is a bipolar winding, it will produce a rotating magnetic field which rotates with respect thereto at 3600 R. P. M. in the same direction as the mechanical rotation of part 17. Consequently the member 20 will remain stationary. Under these conditions the scale 26 is initially positioned so that pointer 25 reads 0 thereon. It is well to observe that the friction between member 20 and the shaft 21 and brushes 24 should be made as small as possible so that the reading on scale 26 will not be influenced thereby. Now let us assume that a motor load is placed on machine 10. The rotor field 11 will then lag behind the rotating magnetic field of the stator an amount depending upon the load conditions and this lag will immediately show up on scale 26 because the rotor 17 is mechanically connected with rotor 11. In other words the displacement which occurs between rotor and stator of machine 10 due to the load does not occur between the rotor and stator of the displacement device, but rather it produces a corresponding displacement of pointer 25 with respect to the stationary scale 26. If the load is a generator load instead of a motor load the displacements will occur in the opposite direction. Thus the device 16 measures the displacement and gives the direction thereof.

The device may be utilized to advantage to control the excitation of either the stator or rotor of machine 10 in proportion to the requirements. I have illustrated how it may be used to increase the rotor excitation of machine 10 when the motor load becomes excessive. Thus when pointer 25 swings over so as to close contacts 27, as best shown in Fig. 1, it short circuits a portion of the resistance 28 in the field circuit of machine 10, thereby increasing the excitation and possibly preventing the motor from falling out of step or improving the conditions of operation as regards power factor.

In accordance with the provisions of the patent statutes, I have described the principle of operation of my invention together with the apparatus which I now consider to represent the best embodiment thereof; but I desire to have it understood that the apparatus shown and described is only illustrative and that the invention may be carried out by other means.

What I claim as new and desire to secure by Letters Patent of the United States is:—

In combination with a main synchronous dynamo electric machine, means responsive to the displacement angle thereof comprising an auxiliary synchronous dynamo electric machine having freely rotatable cooperating parts, means for driving one of said parts in a synchronous relation with the rotating member of said main machine, circuits for electrically connecting the alternating current terminals of said machines in parallel relation, the electrical and mechanical connections between said machines being such as to cause the non-driven part of said auxiliary machine to remain stationary when there is no change in the displacement angle of said main machine, but to rotate in a direction and by an amount dependent upon the direction and extent of change in the displacement angle of said main machine.

In witness whereof I have hereunto set my hand this 3d day of October, 1925.

ERNEST E. JOHNSON.